(12) United States Patent
Eroglu et al.

(10) Patent No.: US 12,500,654 B2
(45) Date of Patent: Dec. 16, 2025

(54) SOUNDING REFERENCE SIGNAL SWITCHING IMPACT MITIGATION

(71) Applicant: QUALCOMM Incorporated, San Diego, CA (US)

(72) Inventors: Yusuf Said Eroglu, Maynard, MA (US); Enoch Shiao-Kuang Lu, San Diego, CA (US); Pranay Sudeep Rungta, New York, NY (US); Prasanna Madhusudhanan, San Diego, CA (US); Yuanning Yu, Santa Clara, CA (US); Tae Min Kim, San Diego, CA (US); Paolo Minero, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 450 days.

(21) Appl. No.: 18/172,986

(22) Filed: Feb. 22, 2023

(65) Prior Publication Data
US 2024/0283520 A1  Aug. 22, 2024

(51) Int. Cl.
*H04B 7/08* (2006.01)
(52) U.S. Cl.
CPC .................................. *H04B 7/0805* (2013.01)
(58) Field of Classification Search
CPC .. H04B 7/0805; H04B 7/0404; H04B 7/0413; H04B 7/0456; H04B 7/0691; H04B 17/24; H04B 7/0817; H04B 7/0608; H04B 7/08; H04B 7/0877; H04B 7/0802; H04B 7/061; H04B 7/0602; H04B 17/327; H04B 7/1555; H04B 7/0604; H04B 7/0628; H04B 7/0632; H04B 7/0639; H04B 7/0486; H04L 25/0226; H04L 25/0224; H04L 25/0204; H04L 5/0023; H04L 5/0051; H04L 25/03923; H04L 25/03343
See application file for complete search history.

(56) References Cited

U.S. PATENT DOCUMENTS

| 2013/0102304 A1* | 4/2013 | Lee ...................... H04L 5/0051 455/422.1 |
| 2016/0119942 A1 | 4/2016 | Wang |
| 2016/0301456 A1 | 10/2016 | Clevorn et al. |
| 2019/0052328 A1 | 2/2019 | Akula et al. |

(Continued)

FOREIGN PATENT DOCUMENTS

WO    WO-2022266599 A1    12/2022

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a user equipment (UE) may select a maximum supported rank for reception that is capped based at least in part on one or more impacted antennas of the UE that are unavailable due to sounding reference signal (SRS) switching that switched at least one antenna of the UE. The UE may transmit an indication of the maximum supported rank. The UE may receive a selected rank that is no greater than the maximum supported rank. The UE may receive, from one or more non-impacted antennas of the UE, a communication using the selected rank. Numerous other aspects are described, such as downlink blanking, desensing parameters, canceling SRS switching, and uplink blanking for impacted antennas.

30 Claims, 11 Drawing Sheets

(56) References Cited

U.S. PATENT DOCUMENTS

| | | |
|---|---|---|
| 2019/0068260 A1* | 2/2019 | Yan ..................... H04B 7/0691 |
| 2019/0356445 A1 | 11/2019 | Manolakos |
| 2020/0037383 A1 | 1/2020 | Rico Alvarino et al. |
| 2021/0337530 A1* | 10/2021 | Raghavan .............. H04B 7/088 |
| 2021/0384949 A1* | 12/2021 | Kumar ................. H04B 7/0404 |
| 2023/0275629 A1* | 8/2023 | Wang ................... H04L 5/0023 |

* cited by examiner

SOUNDING REFERENCE SIGNAL SWITCHING IMPACT MITIGATION

FIELD OF THE DISCLOSURE

Aspects of the present disclosure generally relate to wireless communication and to techniques and apparatuses for mitigating an impact of sounding reference signal switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include selecting a maximum supported rank for reception that is capped based at least in part on one or more impacted antennas of the UE that are unavailable due to sounding reference signal (SRS) switching that switched at least one antenna of the UE. The method may include transmitting an indication of the maximum supported rank. The method may include receiving a selected rank that is no greater than the maximum supported rank. The method may include receiving, from one or more non-impacted antennas of the UE, a communication using the selected rank.

Some aspects described herein relate to a method of wireless communication performed by a UE. The method may include preparing a first communication on a first carrier and a second communication on a second carrier for transmission on a same antenna of the UE, based at least in part on SRS switching that is to switch at least one antenna of the UE. The method may include transmitting the first communication while refraining from transmitting the second communication, based at least in part on a scheduling collision of the first communication and the second communication.

Some aspects described herein relate to a method of wireless communication performed by a UE. The method may include preparing a first communication on a first carrier and a second communication on a second carrier for transmission on a same antenna of the UE, based at least in part on SRS switching that is to switch at least one antenna of the UE. The method may include canceling the SRS switching based at least in part on a scheduling collision of the first communication and the second communication. The method may include transmitting one or more of the first communication or the second communication based at least in part on the canceling.

Some aspects described herein relate to a UE for wireless communication. The UE may include a memory and one or more processors coupled to the memory. The one or more processors may be configured to select a maximum supported rank for reception that is capped based at least in part on one or more impacted antennas of the UE that are unavailable due to SRS switching that switched at least one antenna of the UE. The one or more processors may be configured to transmit an indication of the maximum supported rank. The one or more processors may be configured to receive a selected rank that is no greater than the maximum supported rank. The one or more processors may be configured to receive, from one or more non-impacted antennas of the UE, a communication using the selected rank.

Some aspects described herein relate to a UE for wireless communication. The UE may include a memory and one or more processors coupled to the memory. The one or more processors may be configured to prepare a first communication on a first carrier and a second communication on a second carrier for transmission on a same antenna of the UE, based at least in part on SRS switching that is to switch at least one antenna of the UE. The one or more processors may be configured to transmit the first communication while refraining from transmitting the second communication, based at least in part on a scheduling collision of the first communication and the second communication.

Some aspects described herein relate to a UE for wireless communication. The UE may include a memory and one or more processors coupled to the memory. The one or more processors may be configured to prepare a first communication on a first carrier and a second communication on a second carrier for transmission on a same antenna of the UE, based at least in part on SRS switching that is to switch at least one antenna of the UE. The one or more processors may be configured to cancel the SRS switching, based at least in part on a scheduling collision of the first communication and the second communication. The one or more processors may be configured to transmit one or more of the first communication or the second communication based at least in part on the cancellation of the SRS switching.

Some aspects described herein relate to a non-transitory computer-readable medium that stores a set of instructions for wireless communication by a UE. The set of instructions, when executed by one or more processors of the UE, may cause the UE to select a maximum supported rank for reception that is capped based at least in part on one or more impacted antennas of the UE that are unavailable due to SRS switching that switched at least one antenna of the UE. The set of instructions, when executed by one or more processors of the UE, may cause the UE to transmit an indication of the maximum supported rank. The set of instructions, when executed by one or more processors of the UE, may cause the UE to receive a selected rank that is no greater than the maximum supported rank. The set of instructions, when executed by one or more processors of the UE, may cause the UE to receive, from one or more non-impacted antennas of the UE, a communication using the selected rank.

Some aspects described herein relate to a non-transitory computer-readable medium that stores a set of instructions for wireless communication by a UE. The set of instructions, when executed by one or more processors of the UE, may cause the UE to prepare a first communication on a first carrier and a second communication on a second carrier for transmission on a same antenna of the UE, based at least in part on SRS switching that is to switch at least one antenna of the UE. The set of instructions, when executed by one or more processors of the UE, may cause the UE to transmit the first communication while refraining from transmitting the second communication, based at least in part on a scheduling collision of the first communication and the second communication.

Some aspects described herein relate to a non-transitory computer-readable medium that stores a set of instructions for wireless communication by a UE. The set of instructions, when executed by one or more processors of the UE, may cause the UE to prepare a first communication on a first carrier and a second communication on a second carrier for transmission on a same antenna of the UE, based at least in part on SRS switching that is to switch at least one antenna of the UE. The set of instructions, when executed by one or more processors of the UE, may cause the UE to cancel the SRS switching based at least in part on a scheduling collision of the first communication and the second communication. The set of instructions, when executed by one or more processors of the UE, may cause the UE to transmit one or more of the first communication or the second communication based at least in part on the cancellation of the SRS switching.

Some aspects described herein relate to an apparatus for wireless communication. The apparatus may include means for selecting a maximum supported rank for reception that is capped based at least in part on one or more impacted antennas of the apparatus that are unavailable due to SRS switching that switched at least one antenna of the apparatus. The apparatus may include means for transmitting an indication of the maximum supported rank. The apparatus may include means for receiving a selected rank that is no greater than the maximum supported rank. The apparatus may include means for receiving, from one or more non-impacted antennas of the apparatus, a communication using the selected rank.

Some aspects described herein relate to an apparatus for wireless communication. The apparatus may include means for preparing a first communication on a first carrier and a second communication on a second carrier for transmission on a same antenna of the apparatus, based at least in part on SRS switching that is to switch at least one antenna of the apparatus. The apparatus may include means for transmitting the first communication while refraining from transmitting the second communication, based at least in part on a scheduling collision of the first communication and the second communication.

Some aspects described herein relate to an apparatus for wireless communication. The apparatus may include means for preparing a first communication on a first carrier and a second communication on a second carrier for transmission on a same antenna of the apparatus, based at least in part on SRS switching that is to switch at least one antenna of the apparatus. The apparatus may include means for canceling the SRS switching based at least in part on a scheduling collision of the first communication and the second communication. The apparatus may include means for transmitting one or more of the first communication or the second communication based at least in part on the canceling.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
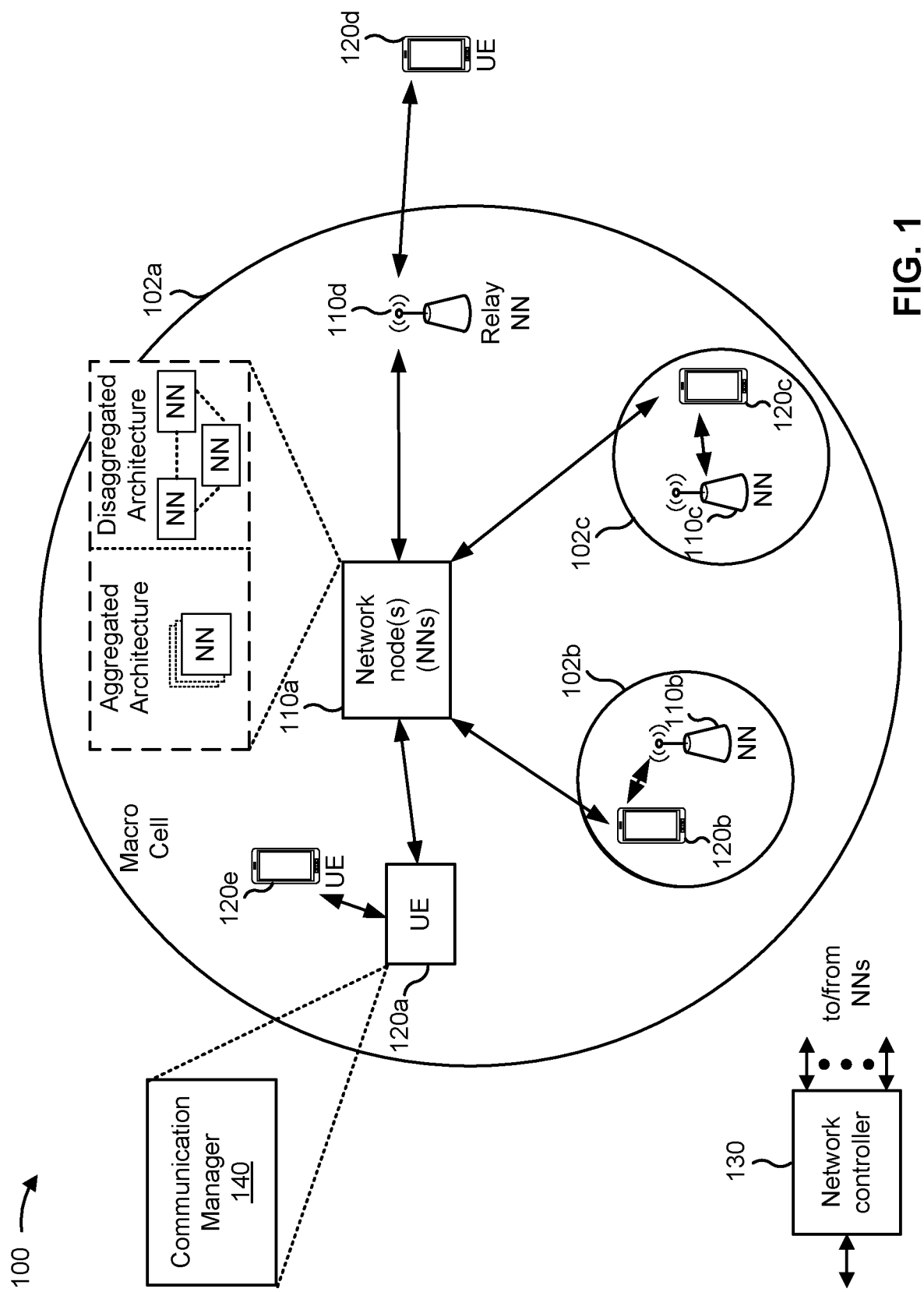
FIG. 1 is a diagram illustrating an example of a wireless network, in accordance with the present disclosure.

A user equipment (UE) may be configured with multiple antennas, and the UE may transmit sounding reference signals (SRSs) with one or more of the antennas. The UE may transmit SRSs to sound a channel so that a network entity can estimate the channel. However, the quantity of antennas of the UE may be limited and thus shared among communication operations and carriers. Accordingly, the UE may switch antennas for the transmission of SRSs. This antenna switching may be referred to as "SRS switching." SRS switching may also involve the transmission or reception of other signals. SRS switching may be for multiple carriers in different radio access technologies (RATs) or carriers.

Depending on the UE configuration, SRS switching on one antenna can impact one or more antennas of the UE. Impacted antennas may be antennas that are not able to transmit or receive scheduled communications due to SRS switching. Impacted antennas reduce throughput. It is challenging to prevent the impact of SRS switching because the impact depends on many factors, such as an antenna switching configuration, a periodicity, the front-end design of an antenna switching module (ASM), and/or a timing.

According to various aspects described herein, a UE may mitigate the impact of SRS switching by determining a lower rank that is capped (limited) such that the rank of a downlink communication on a component carrier (CC) does not lead to an unacceptable impact from the transmission of an SRS for 5G New Radio (NR). The lower rank may be lower than a configured rank for the UE or a network-indicated rank. The lower rank may be considered a maximum supported rank. The UE may indicate the lower rank to a network entity, and the network entity may select and indicate to the UE a rank that is no larger than the maximum supported rank (i.e., the lower rank). The UE may transmit a communication using the selected rank. Such techniques can be used to improve performance of communications on CCs, such as by increasing throughput and reducing communication errors. In some aspects, the UE may mitigate the impact of SRS switching by blanking downlink signals, desensing parameters, or blanking uplink signals.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may select a maximum supported rank for reception that is capped based at least in part on one or more impacted antennas of the UE that are unavailable due to sounding reference signal (SRS) switching that switched at least one antenna of the UE. The communication manager 140 may transmit an indication of the maximum supported rank. The communication manager 140 may receive a selected rank that is no greater than the maximum supported rank. The communication manager 140 may receive, from one or more non-impacted antennas of the UE, a communication using the selected rank.

In some aspects, the communication manager 140 may prepare a first communication on a first carrier and a second communication on a second carrier for transmission on a same antenna of the UE, based at least in part on SRS switching that is to switch at least one antenna of the UE. The communication manager 140 may transmit the first communication while refraining from transmitting the second communication, based at least in part on a scheduling collision of the first communication and the second communication.

In some aspects, the communication manager 140 may prepare a first communication on a first carrier and a second communication on a second carrier for transmission on a same antenna of the UE, based at least in part on SRS switching that is to switch at least one antenna of the UE. The communication manager 140 may cancel the SRS switching based at least in part on a scheduling collision of the first communication and the second communication. The communication manager 140 may transmit one or more of the first communication or the second communication based at least in part on the cancellation of the SRS switching. Additionally, or alternatively, the communication manager 140 may perform one or more other operations described herein.

As indicated above, FIG. 1 is provided as an example. Other examples may differ from what is described with regard to FIG. 1.

Figure 2:
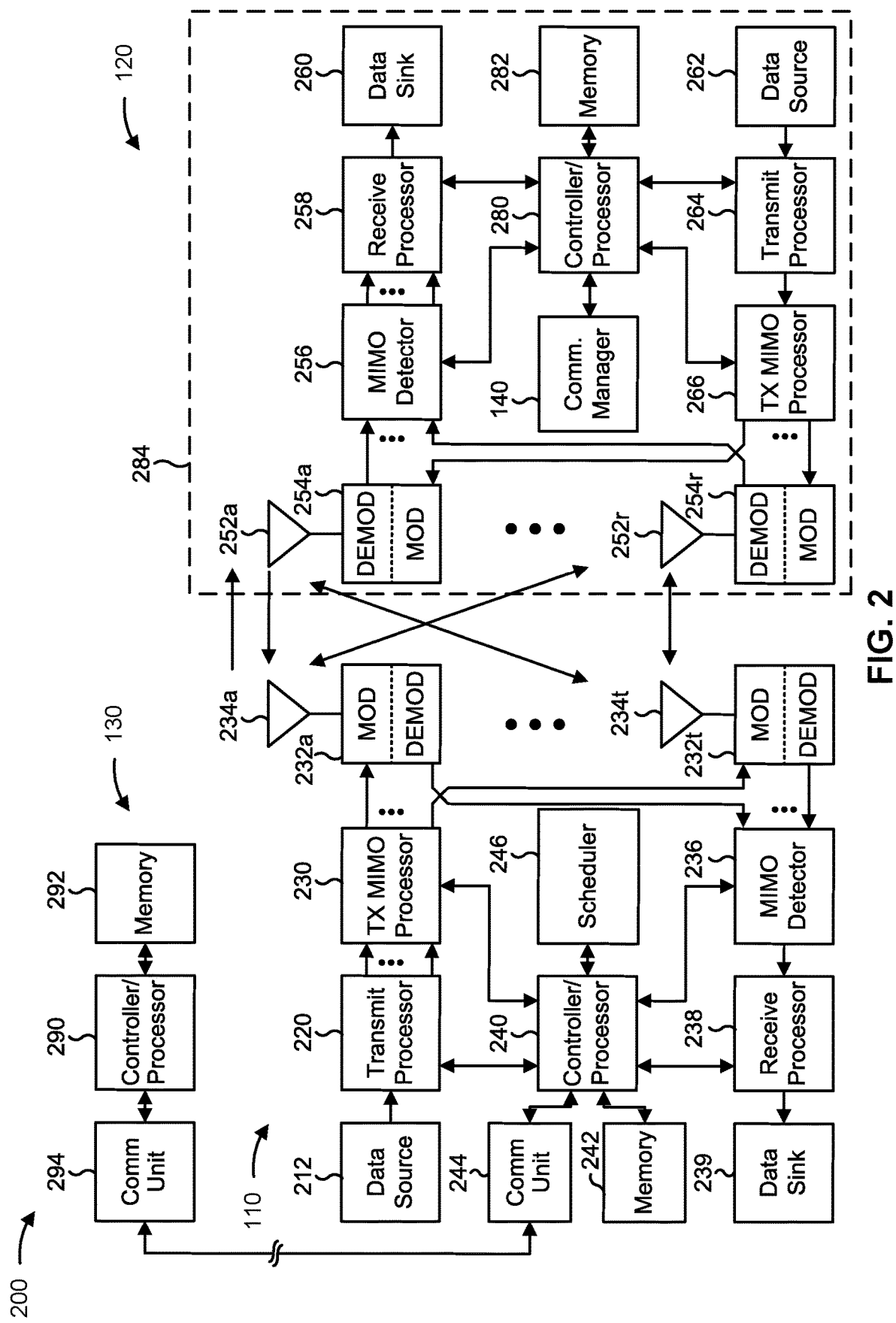
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 1-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 1-11).

The controller/processor 240 of the network node 110, the controller/processor 280 of the UE 120, and/or any other component(s) of FIG. 2 may perform one or more techniques associated with mitigating an impact of SRS switching, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE (e.g., a UE 120) includes means for selecting a maximum supported rank for reception that is capped based at least in part on one or more impacted antennas of the UE that are unavailable due to SRS switching that switched at least one antenna of the UE; means for transmitting an indication of the maximum supported rank; means for receiving a selected rank that is no greater than the maximum supported rank; and/or means for receiving, from one or more non-impacted antennas of the UE, a communication using the selected rank. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., a UE 120) includes means for preparing a first communication on a first carrier and a second communication on a second carrier for transmission on a same antenna of the UE, based at least in part on SRS switching that is to switch at least one antenna of the UE; and/or means for transmitting the first communication while refraining from transmitting the second communication, based at least in part on a scheduling collision of the first communication and the second communication.

In some aspects, a UE (e.g., a UE 120) includes means for preparing a first communication on a first carrier and a second communication on a second carrier for transmission on a same antenna of the UE, based at least in part on SRS switching that is to switch at least one antenna of the UE; means for canceling the SRS switching based at least in part on a scheduling collision of the first communication and the second communication; and/or means for transmitting one or more of the first communication or the second communication based at least in part on the canceling. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
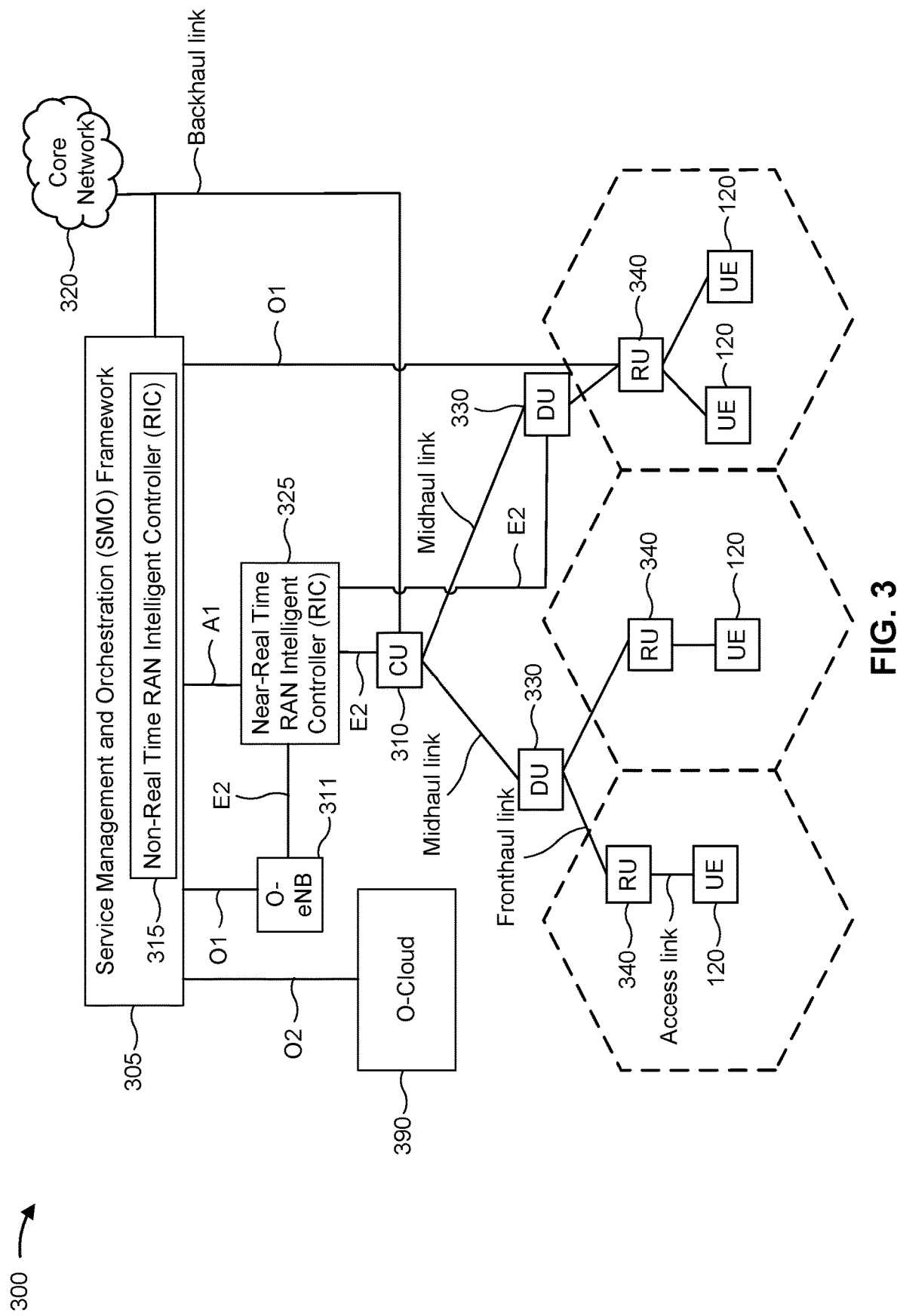
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (e.g., Central Unit-User Plane (CU-UP) functionality), control plane functionality (e.g., Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (e.g., a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
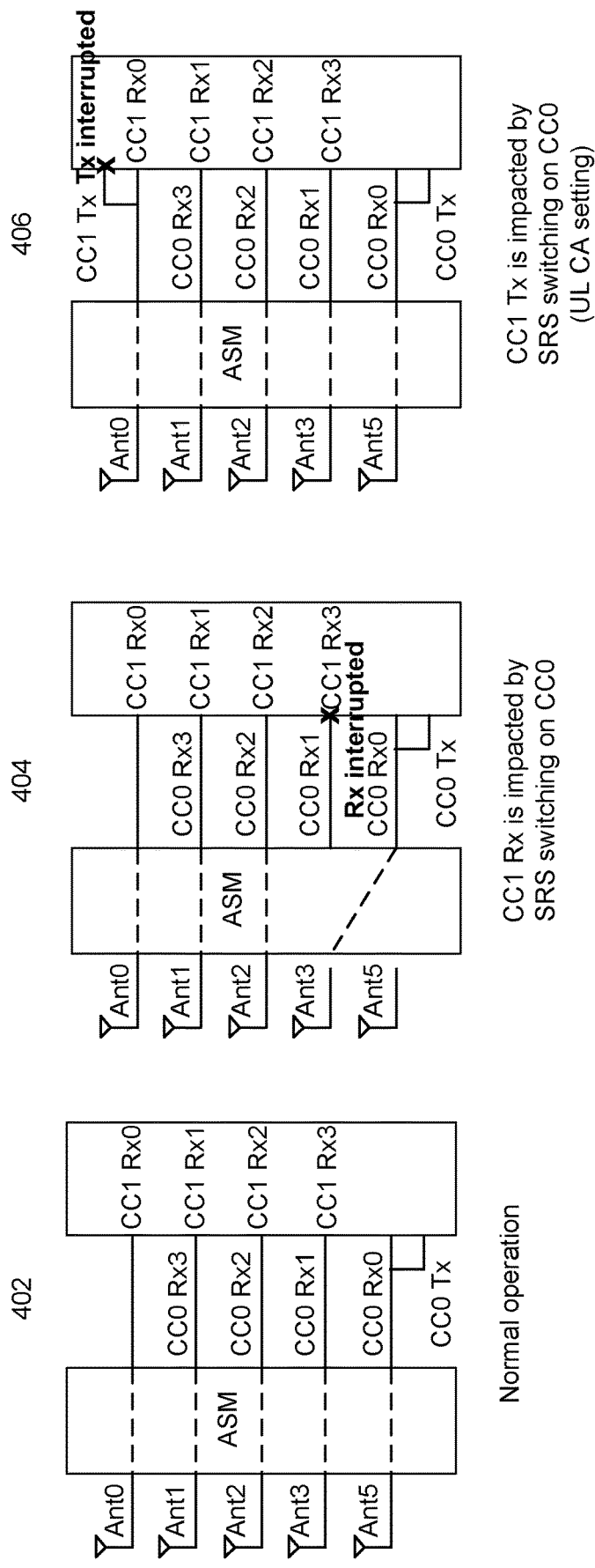
FIG. 4 is a diagram illustrating an example of sounding reference signal (SRS) switching, in accordance with the present disclosure.

FIG. 4 is a diagram illustrating an example 400 of SRS switching, in accordance with the present disclosure. A UE that is configured to perform SRS switching has multiple antennas, such as the five antennas (Ant0, Ant1, Ant2, Ant3, and Ant4) shown in example 400 or a different quantity of antennas. The frequency band involved with SRS switching may need to share antennas with another CC. CC sharing may be necessary if fewer antennas are expected than what is needed to orthogonalize the two carriers.

SRS switching may include antenna switching or carrier switching. For example, SRS switching may include switching one or more antennas for the transmission of SRSs or for the reception of other signals. SRS switching may be for multiple carriers in NR or for a UE in a dual connectivity (DC) mode associated with a first RAT (e.g., LTE) and a second RAT (e.g., NR). A UE performing SRS switching for NR carriers may transmit SRSs in uplink (UL) for sounding the channel. The SRSs may be used for channel estimation by a network entity.

NR may support a variety of SRS configurations, such as a "1T4R" configuration in which SRSs are transmitted for four NR antennas (to sound all four antennas) or a "1T2R" configuration in which SRSs are transmitted for two NR antennas (to sound two out of four antennas). The UE may transmit SRSs from multiple antennas serially (e.g., one antenna after another) on different subframes or symbols within an SRS period. Thus, antenna switching can occur multiple times, and multiple subframes can be impacted within an SRS period (with potentially different sets of antennas impacted in each SRS transmission). NR also supports periodic SRS transmission (configured in an RRC message), semi-persistent SRS transmission, and aperiodic SRS transmission (triggered by downlink control information (DCI)).

As shown in example 400, the UE may include an ASM. The ASM may include various switches, wires, and buses that enable the ASM (and the UE) to switch an antenna from a first carrier (e.g., CC0) to a second carrier (e.g., CC1), and vice versa. A receive chain may include a set of components (such as a demodulator, a de-interleaver, a MIMO detector, an analog-to-digital converter, and a receive processor, described in connection with FIG. 2) that enable the UE to process received communications from an analog form to a digital form. A transmit chain may include a set of components (such as a modulator, an interleaver, a Tx MIMO processor, a digital-to-analog converter, and a transmit processor, described in connection with FIG. 2) that enable the UE to process communications for transmission, such as from a digital form to an analog form.

Front-end configurations of the ASM may impact other carriers for UL or downlink (DL) activity whenever NR SRS switching occurs. NR UL may briefly take over some antennas to transmit SRSs, leaving an impact on the DL of another CC. NR UL may impact the NR UL of another CC in cases of DC or UL carrier aggregation (CA).

SRS switching may interrupt the reception or transmission on a CC. Reasons for the interruption may include the Rx chain being open-circuited because its antenna gets used for SRS switching, the Rx chain being switched to a different antenna during NR SRS, or a lack of isolation between antennas and/or cross switches. In some UEs, antennas and/or cross switches are not shared, but due to the lack of isolation, SRS switching can still impact another antenna. SRS switching may impact another carrier, because the victim carrier will have a high block error rate (BLER), which is likely to cause the UE to drop the whole CC.

Depending on the UE configuration, SRS switching on one antenna can impact only one antenna (either the original Tx antenna of the aggressor band or the antenna SRS is transmitted), two antennas (that are the original Tx antenna of the aggressor band, and the antenna SRS is transmitted), or more than two antennas (due to a combination with poor isolation between the cross switch and the antennas). The CC that is impacted can be an NR band, an LTE band, or another RAT band. The impacted band can be called the "victim band" or "victim CC," since the band is negatively impacted by SRS switching happening on the other band ("aggressor band"). Example frequency band combinations for frequency division duplexing (FDD) and time division duplexing (TDD) may include: B3 [FDD] (victim) and N41 [TDD] (aggressor), or N25 [FDD] (victim) and N41 [TDD]

(aggressor). For a subcarrier spacing (SCS) of 30 kilohertz (kHz), each SRS switching can interrupt up to 2 slots on a subset of Rx or Tx chains.

In example 400, antenna configuration 402 shows normal operation. Ant0 may be used for transmission on CC1 (shown as CC1 Rx0). In some aspects, the transmission and reception on Ant0 are not concurrent or simultaneous. Ant1 may be used for reception on CC0 (CC0 Rx3) and reception on CC1 (CC1 Rx3). Ant2 may be used for reception on CC0 (CC0 Rx2) and reception on CC1 (CC1 Rx2). Ant3 may be used for reception on CC0 (CC0 Rx1) and reception on CC1 (CC1 Rx3). Ant4 may be used for reception on CC0 (CC0 Rx0) and transmission on CC0 (CC0 Tx). In some aspects, the transmission and reception on Ant4 are not concurrent or simultaneous.

To reduce UE manufacturing costs and support a small form factor, and for some band combinations, a UE may not have enough antennas to dedicate (that is, orthogonalize) each antenna to only CC0 or only CC1. As a result, the UE may need to share antennas between CC0 and CC1, such that a particular antenna is used for CC0 at one time and for CC1 at another time. This antenna sharing is particularly applicable to MIMO communications, where data is communicated simultaneously on multiple data streams (or MIMO layers), and the multiple data streams are received simultaneously by the UE via different antennas.

In antenna configuration 404, the ASM switches Ant3 from a receive chain (CC0 Rx1) to a transmit chain (CC0 Tx) to sound Ant3. Ant5 is not used. If Ant3 was being used to receive CC0 Rx1 communications, then this antenna switching of Ant3 degrades performance of downlink communications on CC0. For example, the UE may fail to receive one or more downlink communications or a portion of a downlink communication (such as in one or more time domain resources, such as one or more symbols) on CC0. In some examples (such as for an SCS of 30 kHz), SRS antenna switching for SRS transmission on CC0 may interrupt (Rx interrupt) one or two downlink symbols of a communication on CC0. This may negatively impact the downlink performance of CC0, such as by reducing throughput and by introducing communication errors. Antenna configuration 404 also shows that CC1 RX3 of CC1 is interrupted, where CC0 is the aggressor CC and CC1 is the victim CC.

Antenna configuration 406 shows that CC1 Tx may be interrupted by SRS switching on CC0, such as in a UL CA scenario. In UL CA, SRS switching may impact the UL of the victim carrier, which may carry uplink control information (UCI) for the aggressor carrier and cause all the carriers to become unstable. This issue is present in any NR UE device that supports SRS switching together with CA or DC.

As noted above, it is challenging to prevent the impact of SRS switching because the impact depends on many factors, such as an antenna switching configuration, a periodicity, the front-end ASM design, a timing alignment between the aggressor CC and the victim CC, a quantity of victim Rx chains, and/or scheduling.

As indicated above, FIG. 4 is provided as an example. Other examples may differ from what is described with regard to FIG. 4.

Figure 5:
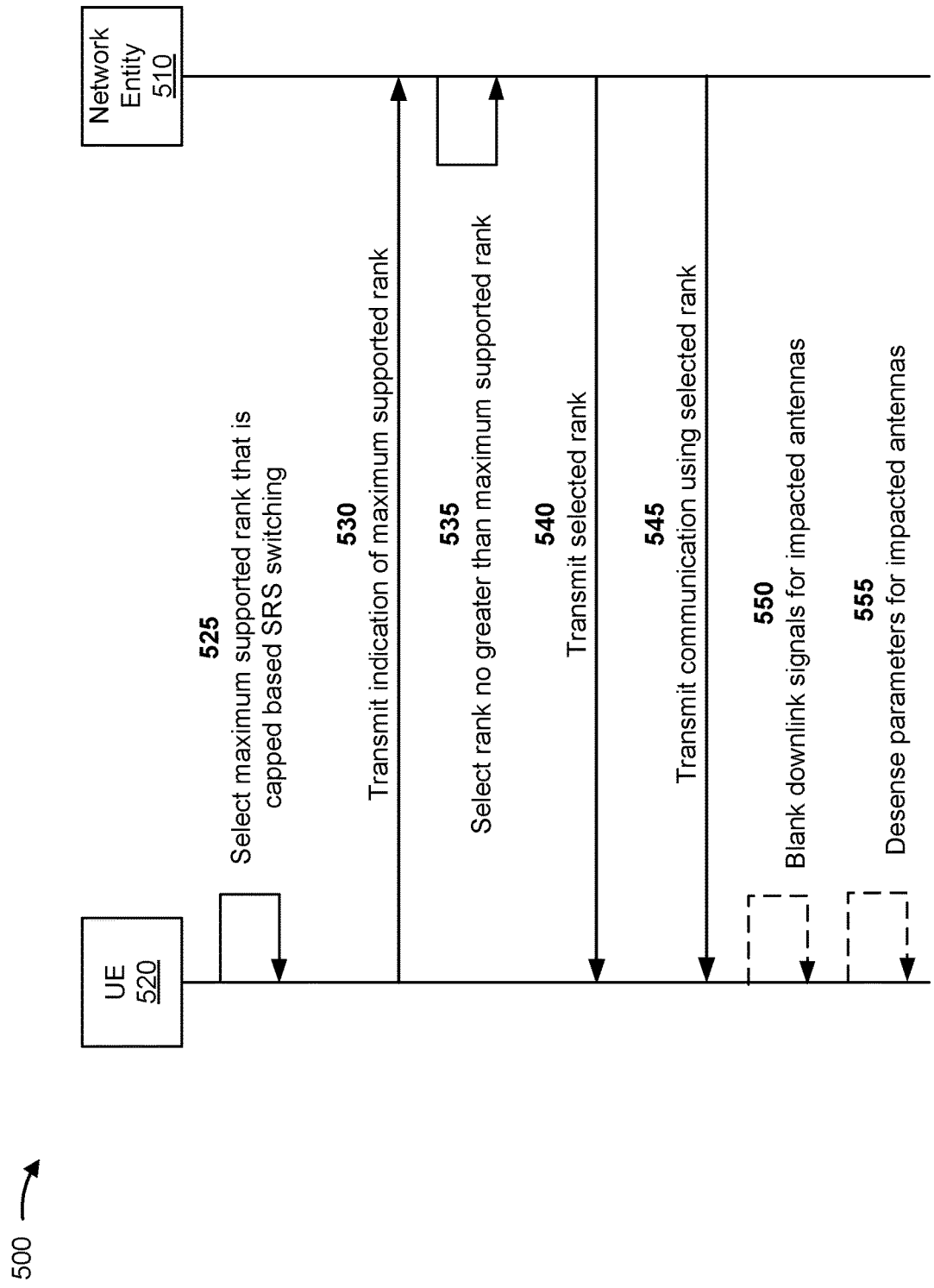
FIG. 5 is a diagram illustrating an example of signaling associated with rank capping, in accordance with the present disclosure.

FIG. 5 is a diagram illustrating an example 500 of signaling associated with rank capping, in accordance with the present disclosure. A network entity 510 (e.g., network node 110) and a UE 520 (e.g., a UE 120) may communicate with each other via a wireless network (e.g., wireless network 100).

According to various aspects described herein, a UE may mitigate the impact of SRS switching by capping (lowering or limiting) a rank so that the lower rank of a downlink communication on a CC (e.g., CC0) does not lead to an unacceptable impact from the transmission of an SRS. The lower rank may be lower than a configured rank for the UE or a network-indicated rank. The lower rank may be considered a maximum supported rank. The UE may indicate the lower rank (maximum supported rank) to a network entity, and the network entity may select and indicate to the UE a rank that is no larger than the maximum supported rank (i.e., the lower rank). The UE may transmit a communication using the selected rank. Rank capping can be used to improve performance of communications on CCs, by increasing throughput and reducing communication errors. Other techniques to mitigate the impact of SRS switching may include blanking downlink signals, desensing parameters, or blanking uplink signals for impacted antennas.

Example 500 shows rank capping that is based on SRS switching. As shown by reference number 525, the UE 520 may select a maximum supported rank for reception that is capped based at least in part on SRS switching. More specifically, the maximum supported rank may be capped based at least in part on one or more impacted antennas of the UE 520 that are unavailable due to SRS switching that switched at least one antenna of the UE 520. Rank capping may improve overall throughput, because a physical downlink shared channel (PDSCH) signal with a lower rank may still be decoded when one or more antennas are impacted.

In some aspects, the UE 520 may select the maximum supported rank based at least in part on a BLER that satisfies an error threshold (e.g., maximum BLER). For example, the UE 520 may cap the rank when anticipating the SRS switching to impact the PDSCH BLER more than 10%. This error threshold may be when the nominal outer loop link adaptation (OLLA) behavior is disturbed and the network entity 510 starts allocating a lower MCS on the same maximum rank. Rank capping may be avoided when the OLLA behavior is not expected to be disturbed. The UE 520 may determine the BLER based at least in part on downlink slots that are impacted with block errors. The UE 520 may determine the BLER based at least in part on collisions between SRS switching and resource allocations on a victim carrier.

In some aspects, the UE 520 may select the maximum supported rank based at least in part on a quantity of transmit antennas of the UE 520 and a quantity of receive antennas of the UE 520. The UE 520 may select the maximum supported rank based at least in part on a quantity of carriers performing the SRS switching.

As shown by reference number 530, the UE 520 may transmit an indication of the maximum supported rank. This will prompt the network entity 510 to give the UE 520 PDSCH grants that have a rank that is no greater than the quantity of unimpacted receive antennas. As shown by reference number 535, the network entity 510 may select a rank that is no greater than the maximum supported rank. The network entity 510 select the rank based at least in part on traffic conditions and/or channel conditions. As shown by reference number 540, the network entity 510 may transmit a selected rank. As shown by reference number 545, the network entity 510 may transmit a communication using the selected rank. The UE 520 may receive the communication using the selected rank.

SRS switching can corrupt the impacted receive antenna on the victim CC on symbols where the SRS switching is occurring. By discarding the impacted receive antenna and reducing the maximum supported rank to be equal to the number of unimpacted receive antennas, the UE 520 may improve throughput and reduce latency.

In some aspects, the UE 520 may determine the expected BLER percentage using a passive method or an active method. The passive method includes considering all DL slots that are impacted as having an increased BLER. This can be done ahead of time without waiting for any impact to occur. This may be applicable to periodic SRS transmission. The active method may include observing the collisions between SRS switching and actual physical downlink control channel (PDCCH) or PDSCH allocations on the victim CC. This may work for periodic SRS transmission or aperiodic SRS transmission.

In some aspects, the UE 520 may use an algorithm to estimate the BLER percentage passively. First, the UE 520 may not count the SRS switching resource with the default antenna (will not be considered to increase the BLER). Second, for each of the remaining resources, the UE 520 may combine the resources that are in the same slot. For example, there may be SRS switching resources in (slot 5, symbol 8), (slot 5, symbol 10), and (slot 10, symbol 8). The first group may be slot 5 from symbol 8 to symbol 10, and the second group may be slot 10, symbol 8. Resources within a slot are combined because the impact may last until the cross-switch is returned to the default setting. As a shortcut, the UE 520 may consider resources with the latest symbol in the same slot. Third, for each group (starts in symbol x and ends in symbol y), the UE 520 may calculate how many victim slots overlap with an SRS slot. If the SRS slot is even, two victim slots are impacted. Otherwise, if the SRS slot is odd, and if the ending symbol y is 13, two victim slots are impacted; if not, one victim slot is impacted. Fourth, if N is the cumulative quantity of victim slots calculated in the third step, then the SRS switching with periodicity P TDD slots will affect N victim slots, such that the BLER=$N/(P/2)$.

In some aspects, rank capping can handle aperiodic SRS transmission and semi-persistent SRS transmission. In these scenarios, the actual frequency of the SRS transmissions is not known at the time of RRC configuration. If the network entity 510 does not schedule conflicting SRS and DL channels, rank capping may not be needed. However, it is not possible for the UE to know what the network entity 510 is avoiding the scheduling conflict before the conflict occurs. Accordingly, in some aspects, the UE 520 may follow multiple rank capping decision steps. First, a receiver may observe impacted DL channels and note when SRS switching collides with a DL channel. Once the receiver sends the notification, the UE 520 may set a sticky flag about the SRS impact and indicating that rank capping evaluation should be run. This sticky flag may be reset when there is an appropriate resetting event. Third, as part of the rank capping evaluation, the UE 520 may keep track of receiver interface notifications. Once a notification threshold is reached for a time window, the UE 520 may cap the rank.

In some aspects, rank capping may be more persistent, and may be based at least in part on a network flag that triggers a rank capping evaluation. The UE 520, once triggered, may not return to a non-rank-capping procedure until a resetting event (e.g., a cell deactivation, an RRC reconfiguration, an antenna configuration change, an antenna switching diversity change) occurs. The above steps for a rank capping decision may be the same for periodic, aperiodic, or semi-persistent SRS switching.

In some aspects, if SRS switching is for an antenna configuration of 1T4R, the UE 520 may expect that one receive antenna will be impacted, such that the rank is capped at 3. If SRS switching is for an antenna configuration of 2T4R, the UE 520 may expect that two receive antennas will be impacted, such that the rank is capped at 2.

If more than one carrier is performing SRS switching, further rank capping may be expected. Using the active method to estimate BLER, the UE 520 may observe how many receive antennas are impacted and determine the rank based at least in part on how many carriers are performing SRS switching. Using the passive method to estimate BLER, the UE 520 may expect the worst and sum the number of impacted antennas from each aggressor CC. For example, for two aggressor CCs for 1T4R and 2T4R, the UE 520 may expect that three receive antennas will be impacted and decrease the rank to 1. The rank may be decreased to 1 as the lowest value. That is, even if it is expected that aggressor CCs will impact 4 or more antennas, the rank will still be 1.

In some aspects, as shown by reference number 550, the UE 520 may blank downlink signals for impacted antennas. DL Blanking may include zeroing out the received samples to prevent the affected samples from affecting a likelihood ratio (LLR), a DMRS signal-to-noise ratio (SNR), and channel estimates.

Rank capping may enable the UE 520 to decode a PDSCH communication even if a subset of antennas are impacted. However, to further ensure that impacted antennas do not affect PDSCH decoding, in some aspects, the UE 520 may blank downlink signals for impacted antennas. The blanking of downlink signals may include blanking time domain (TD) samples and/or nulling the impact on channel estimates.

In some aspects, the UE 520 may zero out TD samples on corrupted symbols of an impacted receive antenna. The UE 520 may be provided a start time and an end time of an SRS impact. The UE 520 may receive a bitmap of impacted receive antennas. The UE 520 may translate the start time and the end time to impacted symbols or slots. The impacted symbols or slots may change per receive antenna depending on the impact type for each receive antenna. The UE 520 may blank the downlink signals based at least in part on a start time of the SRS switching, an end time of the SRS switching, and a bitmap indicating the one or more impacted antennas. A downlink front-end (DLFE) of the UE 520 may replace the received signal with a zero for the impacted antennas and symbols. The UE 520 may compute a DMRS energy estimate (EE) value based at least in part on blanked symbols that are dropped.

In some aspects, the UE 520 may null the impact on the channel estimate. When the impacted symbols are non-DMRS symbols, the procedure may be as follows. Since the DMRS symbols are not impacted, the channel estimation is unaware of any receive antennas that are impacted. The corresponding estimates for a channel estimate matrix H and a recurrent neural network (Rnn) that is used for channel estimation with machine learning may not correctly represent the zeroed-out PDSCH frequency-domain (FD) samples that result from the TD sample blanking at the DLFE. This leads to significant throughput degradation, and to recover from this degradation, the UE 520 may use the following solution. The UE 520 may apply a zero-out value to the demapper (DEMAP). The demapper may null H for an affected symbol of an affected receive antenna, by overwriting the received H value. The focus may be on improving the performance in the scenario where the SRS appears at the end of the slot and impacts only symbols 12 and 13, which are non-DMRS symbols. Most of the performance loss is recovered. For example, no DMRS symbols may be impacted and almost all of the throughput may be recovered with H nulling.

In some aspects, downlink blanking may include nulling the impact on a channel estimate. This may include zeroing out the channel or nulling channel matrix entries (of H) associated with each of one or more impacted antennas, based at least in part on the downlink signals that include DMRS symbols. The UE 520 may also null a H for symbols in a slot that is associated with one or more impacted antennas. The TD samples may already be zeroed out, so the corresponding FD samples may be zeros.

For example, when the impacted symbols include DMRS symbols, the UE 520 may null the impacted receive antennas on all symbols of the impacted slot by artificially boosting Rnn along with nulling the estimated channel explicitly on all symbols of the slot. Rnn boosting on the impacted RX may imply nulling the Y samples via the whitening matrix.

The impacted receive antenna may need to be disregarded for all of the symbols in the slot. Since the DMRS symbol is impacted, channel estimates corresponding to the receive antenna on all symbols of the slot may be impacted and are expected to be discarded. In some aspects, the UE 520 may perform H nulling. This may include overwriting H with 0 on all of the symbols of the slot of the receive antenna. This contrasts with the case when a non-DMRS symbol was impacted by SRS switching, in which the UE 520 overwrote the H only on the impacted symbol of the slot of the impacted receive antenna. For example, symbol 11 (DMRS symbol) may be impacted, as well as symbols 12 and 13. The rank may be 1. With a high Doppler value, DMRS may be more important, so the impact on the performance is greater. With H nulling and Rnn boosting, the UE 520 may recover most of the loss.

In some aspects, as shown by reference number 555, the UE 520 may desense parameters for impacted antennas. Desensing parameters may include ignoring the parameters or using different values for the parameters that lessen the effect of the parameters for the impacted antennas. Desensing parameters may include disregarding the corrupted signal while observing or calculating a frequency-tracking loop (FTL), a time-tracking loop (TTL), a tracking reference signal (TRS), and/or a channel state function (CSF). For example, to prevent corruption of an FTL, a TTL, a TRS, a CSF, and/or automatic gain control (AGC), the UE 520 may adjust a signal-to-noise ratio (SNR) floor value for an FTL.

In some aspects, desensing the parameters may include skipping a signal-plus-noise energy (SNE) filter update. For example, the UE 520 may set the SNE filter loop update to 0 to skip the SNE filter update. The signal energy (SE) combining may be based at least in part on the old SNE/noise energy (NE) states for the impacted antenna.

In some aspects, desensing the parameters may include indicating that a value associated with the downlink signals is invalid. SSBs and TRSs may not be impacted by SRS switching, while a PDSCH DMRS may be impacted. As a result, the UE 520 may selectively ignore the estimated channel parameters from the SSB and the TRS parameters for the impacted antennas.

As indicated above, FIG. 5 is provided as an example. Other examples may differ from what is described with regard to FIG. 5.

Figure 6:
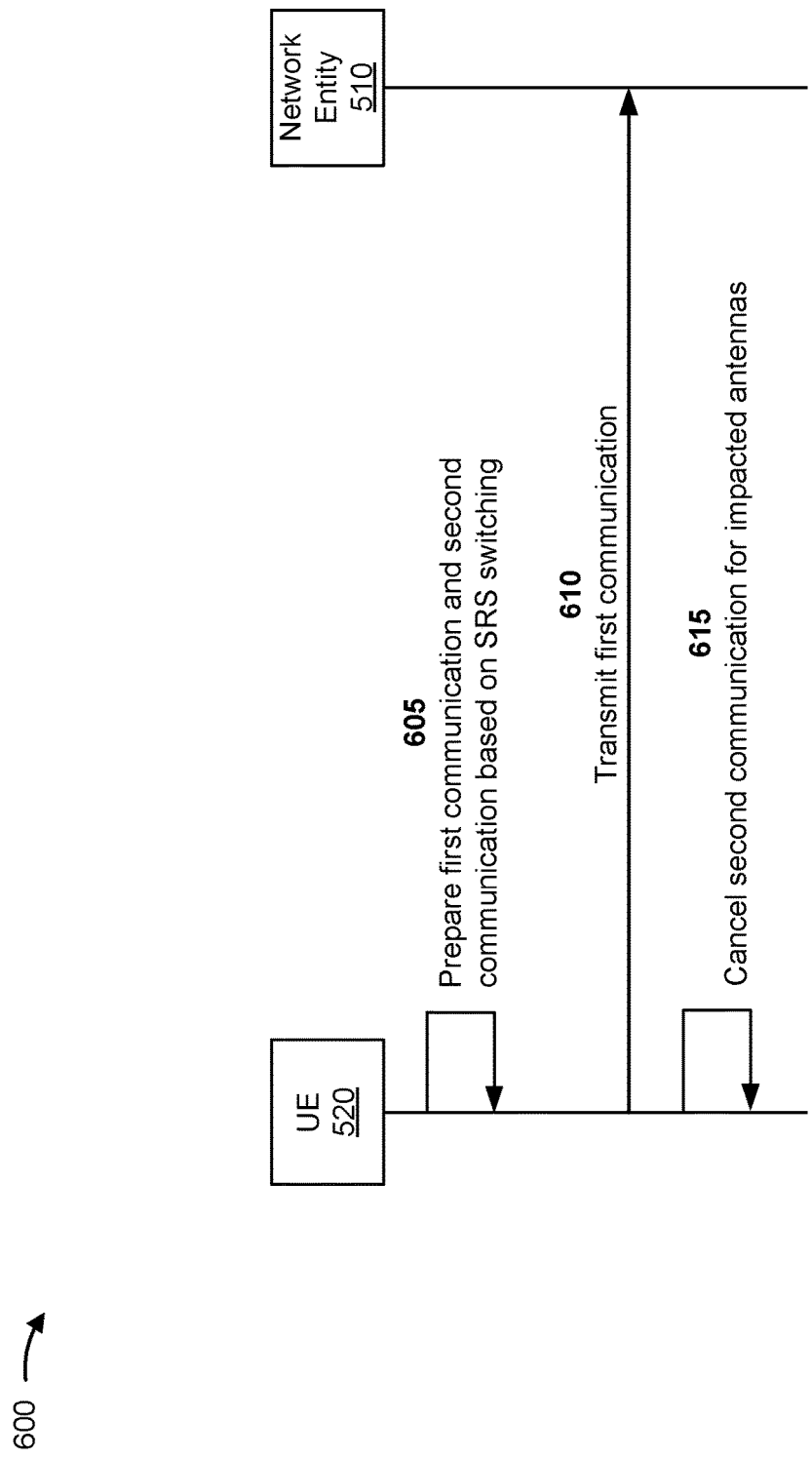
FIG. 6 is a diagram illustrating an example of canceling transmission of a communication for impacted antennas, in accordance with the present disclosure.

FIG. 6 is a diagram illustrating an example 600 of canceling transmission of a communication for impacted antennas, in accordance with the present disclosure.

When SRS switching is performed in UL CA mode, it is likely that the SRS switching will impact the UL transmit antenna of the other carrier. In this scenario, the UL transmission will be impacted and will not be received successfully by the recipient device. Depending on the radio frequency (RF) configuration, the SRS transmission can also be corrupt and such collision on a transmit antenna can damage components such as a power amplifier (PA).

In some aspects, the UE 520 may perform UL blanking. UL blanking may include preventing (canceling or refraining from) transmissions that can collide with SRS switching on the same antenna. For example, the UE 520 may blank one of the UL transmissions, either for the aggressor SRS antenna or the victim UL transmit antenna. With this solution, one of the UL transmissions will be transmitted successfully, and the hardware will be protected.

Example 600 shows UL blanking. As shown by reference number 605, the UE 520 may prepare a first communication and a second communication based at least in part on SRS switching. The first communication and the second communication may be scheduled to be transmitted using UL CA. As shown by reference number 610, the UE 520 may transmit the first communication. The UE 520 may schedule the second communication to be transmitted using an impacted antenna that is not available due to the SRS switching.

As shown by reference number 615, the UE 520 may cancel the second transmission for the impacted antennas. Canceling the second communication may include refraining from transmitting the second communication. The canceling may be based at least in part on a scheduling collision. For example, the scheduler may drop one of the UL transmissions. Some time advance may be expected for implementation, and it may not be possible to drop the UL transmission if SRS switching is scheduled late. Dropping a UL transmission may include deactivating a digital-to-analog converter (DAC) for an impacted communication of the first communication and the second communication.

As indicated above, FIG. 6 is provided as an example. Other examples may differ from what is described with regard to FIG. 6.

Figure 7:
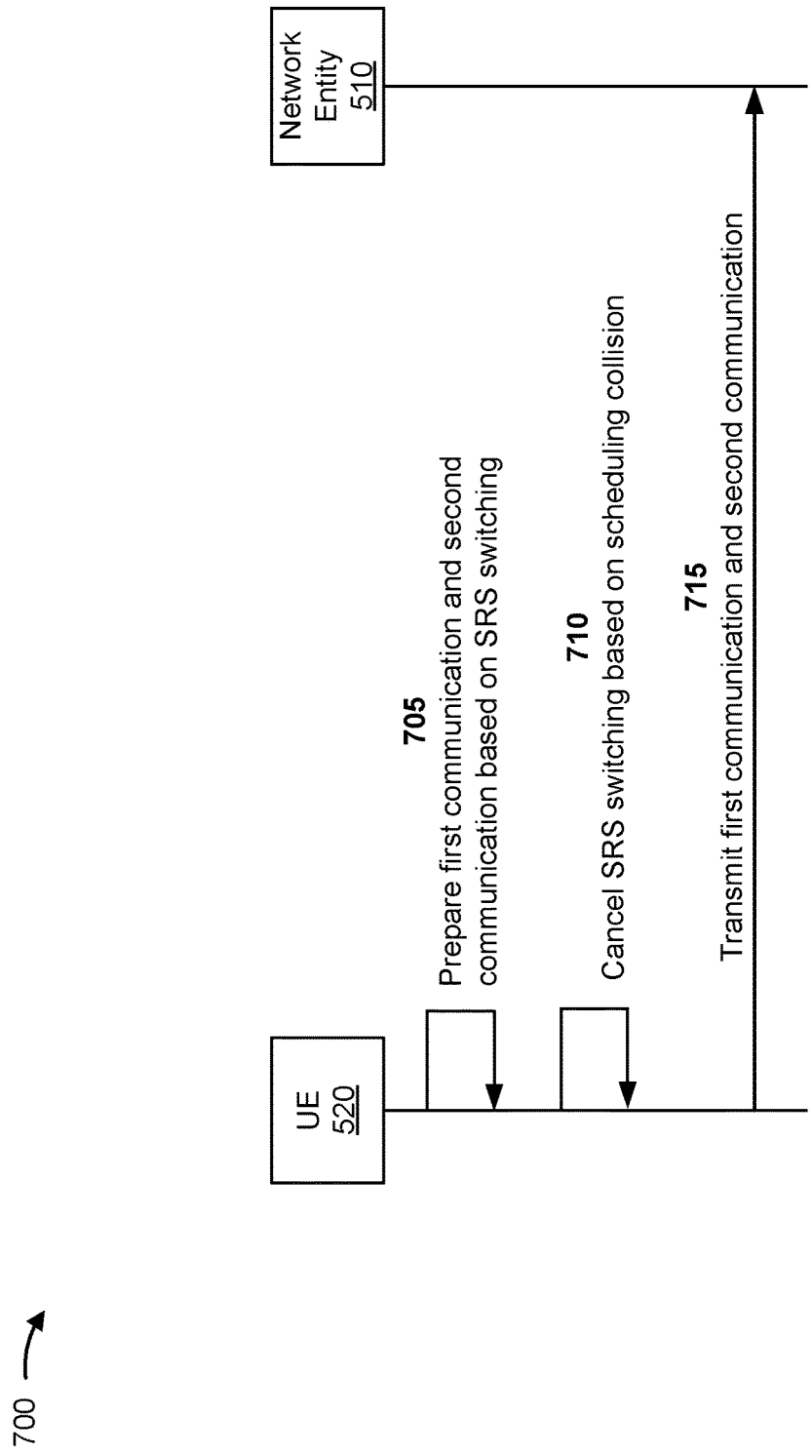
FIG. 7 is a diagram illustrating an example of canceling SRS switching for impacted antennas, in accordance with the present disclosure.

FIG. 7 is a diagram illustrating an example 700 of canceling SRS switching for impacted antennas, in accordance with the present disclosure.

As shown by reference number 705, the UE 520 may prepare a first communication and a second communication based at least in part on SRS switching. As shown by reference number 710, the UE 520 may cancel SRS switching based at least in part on a scheduling collision. As shown by reference number 715, the UE 520 may transmit the first communication and the second communication.

The aspects described herein enable the UE 520 with NR SRS switching to operate with another band (e.g., DC or CA). Without these aspects, the UE 520 may have to rely on the network to avoid possible conflicts between SRS switching and the other carrier. If a network entity does not avoid scheduling conflicts, and one of these aspects are not applied, the victim CC could suffer high BLER and low throughput. The aspects described herein provide a wider range of technologies and a more complete set of solutions for mitigating the impact of SRS switching. As a result, throughput is increased, latency is reduced, and damage to hardware is prevented.

As indicated above, FIG. 7 is provided as an example. Other examples may differ from what is described with regard to FIG. 7.

Figure 8:
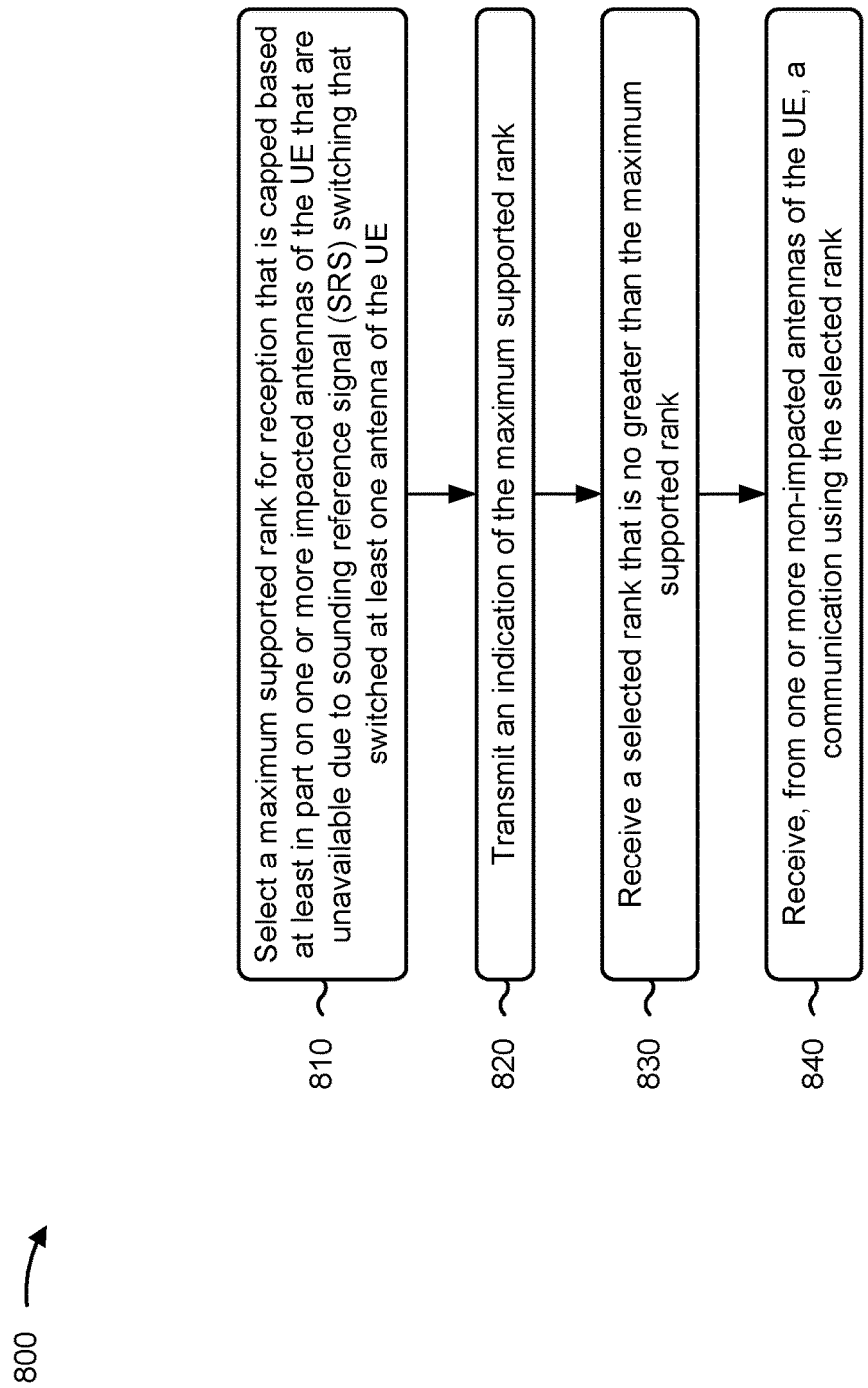
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120, UE 520) performs operations associated with mitigating the impact of SRS switching.

As shown in FIG. 8, in some aspects, process 800 may include selecting a maximum supported rank for reception that is capped based at least in part on one or more impacted antennas of the UE that are unavailable due to SRS switching that switched at least one antenna of the UE (block 810). For example, the UE (e.g., using communication manager 1106, depicted in FIG. 11) may select a maximum supported rank for reception that is capped based at least in part on one or more impacted antennas of the UE that are unavailable due to SRS switching that switched at least one antenna of the UE, as described above in connection with FIGS. 4-7.

As further shown in FIG. 8, in some aspects, process 800 may include transmitting an indication of the maximum supported rank (block 820). For example, the UE (e.g., using transmission component 1104 and/or communication manager 1106, depicted in FIG. 11) may transmit an indication of the maximum supported rank, as described above in connection with FIGS. 4-7.

As further shown in FIG. 8, in some aspects, process 800 may include receiving a selected rank that is no greater than the maximum supported rank (block 830). For example, the UE (e.g., using reception component 1102 and/or communication manager 1106, depicted in FIG. 11) may receive a selected rank that is no greater than the maximum supported rank, as described above in connection with FIGS. 4-7.

As further shown in FIG. 8, in some aspects, process 800 may include receiving, from one or more non-impacted antennas of the UE, a communication using the selected rank (block 840). For example, the UE (e.g., using reception component 1102 and/or communication manager 1106, depicted in FIG. 11) may receive, from one or more non-impacted antennas of the UE, a communication using the selected rank, as described above in connection with FIGS. 4-7.

Process 800 may include additional aspects, such as any single aspect or any combination of aspects described below and/or in connection with one or more other processes described elsewhere herein.

In a first aspect, selecting the maximum supported rank includes selecting the maximum supported rank based at least in part on a BLER satisfying an error threshold.

In a second aspect, alone or in combination with the first aspect, process 800 includes determining the BLER based at least in part on downlink slots that are impacted with block errors.

In a third aspect, alone or in combination with one or more of the first and second aspects, process 800 includes determining the BLER based at least in part on collisions between SRS switching and resource allocations on a victim carrier.

In a fourth aspect, alone or in combination with one or more of the first through third aspects, selecting the maximum supported rank includes selecting the maximum supported rank based at least in part on a quantity of transmit antennas of the UE and a quantity of receive antennas of the UE.

In a fifth aspect, alone or in combination with one or more of the first through fourth aspects, selecting the maximum supported rank includes selecting the maximum supported rank based at least in part on a quantity of carriers performing the SRS switching.

In a sixth aspect, alone or in combination with one or more of the first through fifth aspects, process 800 includes blanking downlink signals for the one or more impacted antennas.

In a seventh aspect, alone or in combination with one or more of the first through sixth aspects, blanking the downlink signals includes zeroing TD samples associated with the one or more impacted antennas.

In an eighth aspect, alone or in combination with one or more of the first through seventh aspects, blanking the downlink signals includes nulling channel matrix entries associated with each of the one or more impacted antennas, based at least in part on the downlink signals including DMRSs.

In a ninth aspect, alone or in combination with one or more of the first through eighth aspects, process 800 includes nulling channel matrix entries for symbols in a slot that is associated with the one or more impacted antennas.

In a tenth aspect, alone or in combination with one or more of the first through ninth aspects, blanking the downlink signals includes blanking the downlink signals based at least in part on a start time of the SRS switching, an end time of the SRS switching, and a bitmap indicating the one or more impacted antennas.

In an eleventh aspect, alone or in combination with one or more of the first through tenth aspects, process 800 includes desensing parameters for downlink signals for the one or more impacted antennas.

In a twelfth aspect, alone or in combination with one or more of the first through eleventh aspects, desensing the parameters includes determining one or more of an FTL, a TTL, a TRS, or a CSF based at least in part on disregarding the downlink signals for the one or more impacted antennas.

In a thirteenth aspect, alone or in combination with one or more of the first through twelfth aspects, desensing the parameters includes adjusting an SNR floor value for an FTL.

In a fourteenth aspect, alone or in combination with one or more of the first through thirteenth aspects, desensing the parameters includes one or more of setting an MRCW size for an FTL to zero, or excluding the downlink signals from FTL MRC combining.

In a fifteenth aspect, alone or in combination with one or more of the first through fourteenth aspects, desensing the parameters includes one or more of setting an MRCW size for Doppler to zero, excluding the downlink signals from Doppler MRC combining, or excluding the downlink signals in an algorithm used for a Doppler calculation.

In a sixteenth aspect, alone or in combination with one or more of the first through fifteenth aspects, desensing the parameters includes skipping an SNE filter update.

In a seventeenth aspect, alone or in combination with one or more of the first through sixteenth aspects, desensing the parameters includes indicating that a value associated with the downlink signals is invalid.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
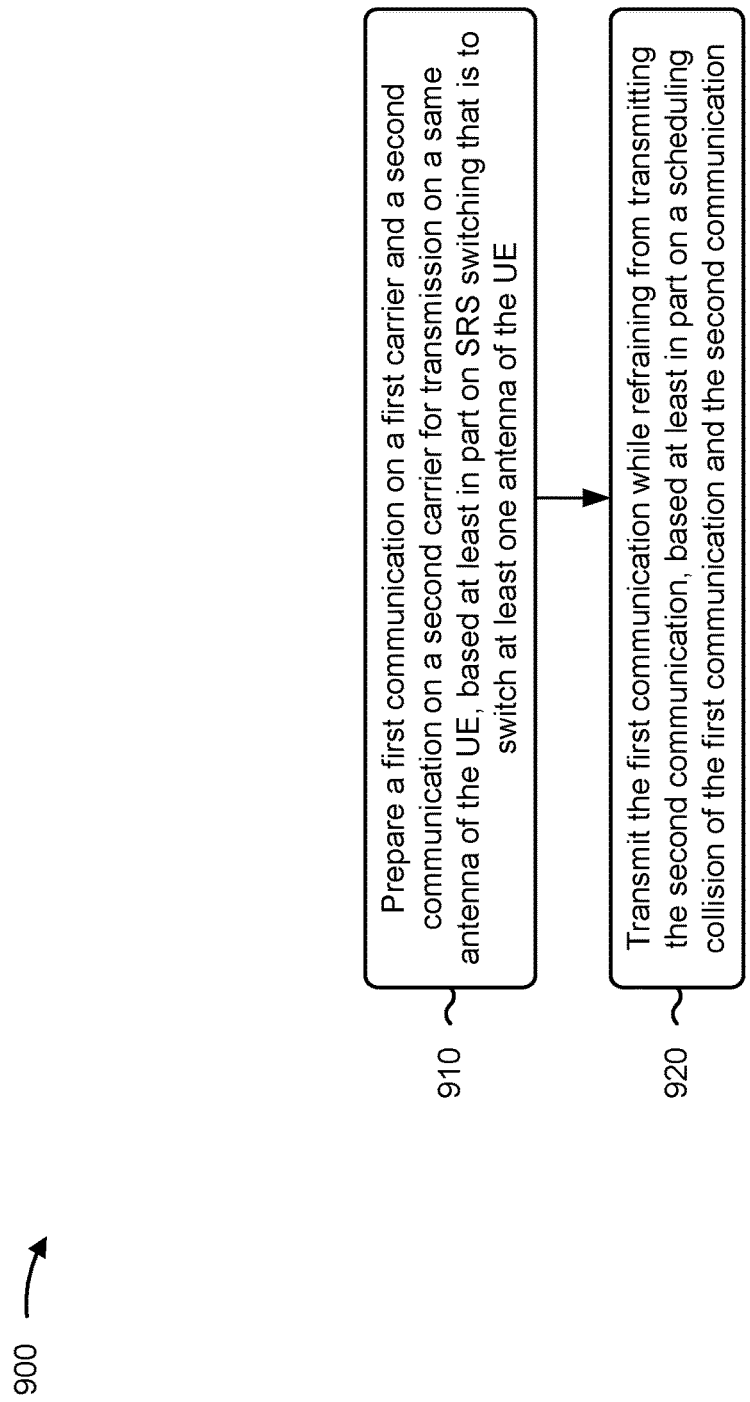
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120, UE 520) performs operations associated with mitigating the impact of SRS switching.

As shown in FIG. 9, in some aspects, process 900 may include preparing a first communication on a first carrier and a second communication on a second carrier for transmission on a same antenna of the UE, based at least in part on SRS switching that is to switch at least one antenna of the UE (block 910). For example, the UE (e.g., using communication manager 1106, depicted in FIG. 11) may prepare a first communication on a first carrier and a second communication on a second carrier for transmission on a same antenna of the UE, based at least in part on SRS switching that is to switch at least one antenna of the UE, as described above in connection with FIGS. 4-7.

As further shown in FIG. 9, in some aspects, process 900 may include transmitting the first communication while refraining from transmitting the second communication, based at least in part on a scheduling collision of the first communication and the second communication (block 920). For example, the UE (e.g., using transmission component 1104 and/or communication manager 1106, depicted in FIG. 11) may transmit the first communication while refraining from transmitting the second communication, based at least in part on a scheduling collision of the first communication and the second communication, as described above in connection with FIGS. 4-7.

Process 900 may include additional aspects, such as any single aspect or any combination of aspects described below and/or in connection with one or more other processes described elsewhere herein.

In a first aspect, the second communication is scheduled to be transmitted using an impacted antenna that is not available due to the SRS switching.

In a second aspect, alone or in combination with the first aspect, the first communication and the second communication are scheduled to be transmitted using UL CA.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
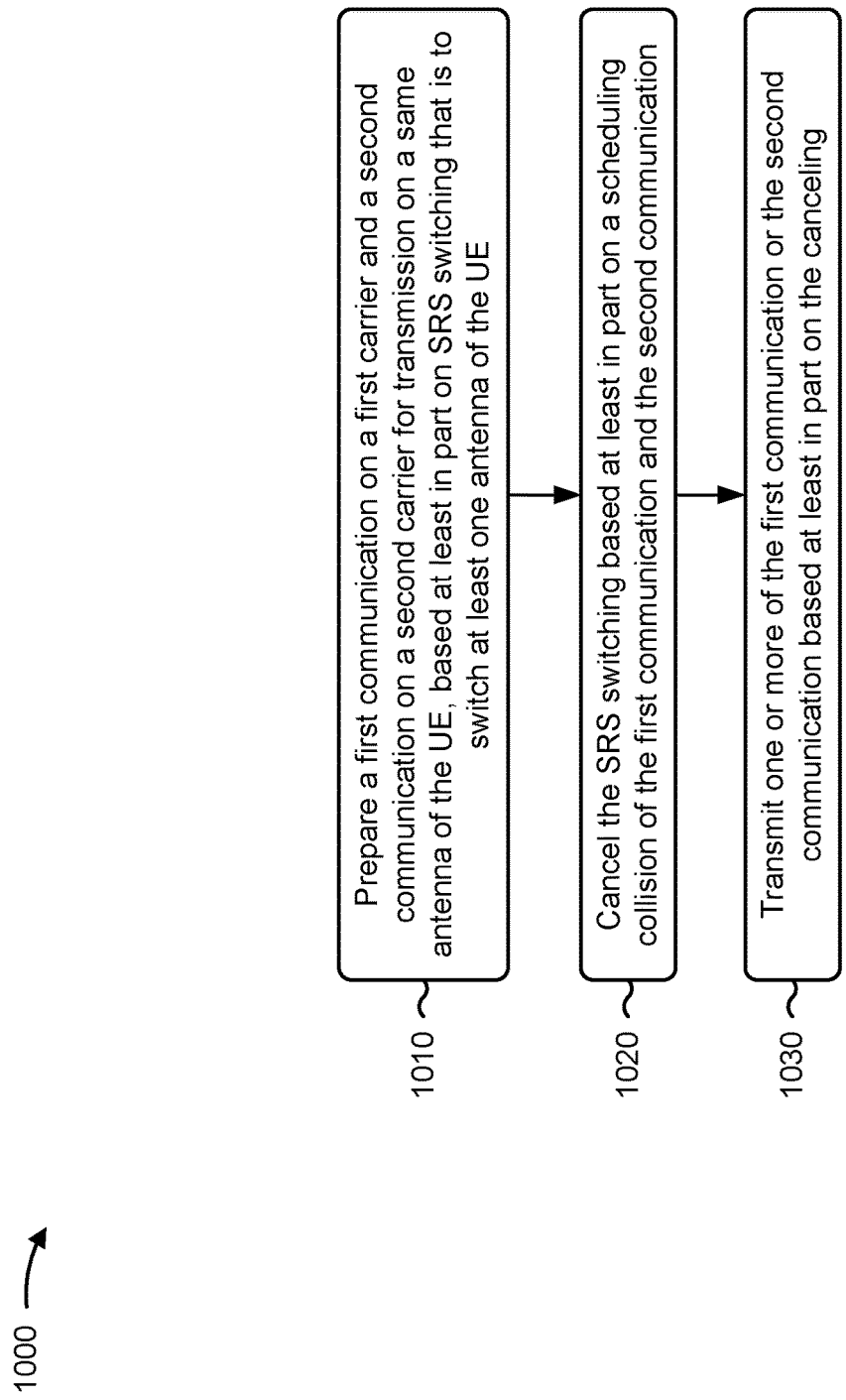
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with mitigating the impact of SRS switching.

As shown in FIG. 10, in some aspects, process 1000 may include preparing a first communication on a first carrier and a second communication on a second carrier for transmission on a same antenna of the UE, based at least in part on SRS switching that is to switch at least one antenna of the UE (block 1010). For example, the UE (e.g., using communication manager 1106, depicted in FIG. 11) may prepare a first communication on a first carrier and a second communication on a second carrier for transmission on a same antenna of the UE, based at least in part on SRS switching that is to switch at least one antenna of the UE, as described above in connection with FIGS. 4-7.

As further shown in FIG. 10, in some aspects, process 1000 may include canceling the SRS switching based at least in part on a scheduling collision of the first communication and the second communication (block 1020). For example, the UE (e.g., using communication manager 1106, depicted in FIG. 11) may cancel the SRS switching based at least in part on a scheduling collision of the first communication and the second communication, as described above in connection with FIGS. 4-7.

As further shown in FIG. 10, in some aspects, process 1000 may include transmitting one or more of the first communication or the second communication based at least in part on the canceling (block 1030). For example, the UE (e.g., using transmission component 1104 and/or communication manager 1106, depicted in FIG. 11) may transmit one or more of the first communication or the second communication based at least in part on the canceling, as described above in connection with FIGS. 4-7.

Process 1000 may include additional aspects, such as any single aspect or any combination of aspects described below and/or in connection with one or more other processes described elsewhere herein.

In a first aspect, process 1000 includes deactivating a digital-to-analog converter for an impacted communication of the first communication and the second communication.

In a second aspect, alone or in combination with the first aspect, the first communication and the second communication are scheduled to be transmitted using UL CA.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
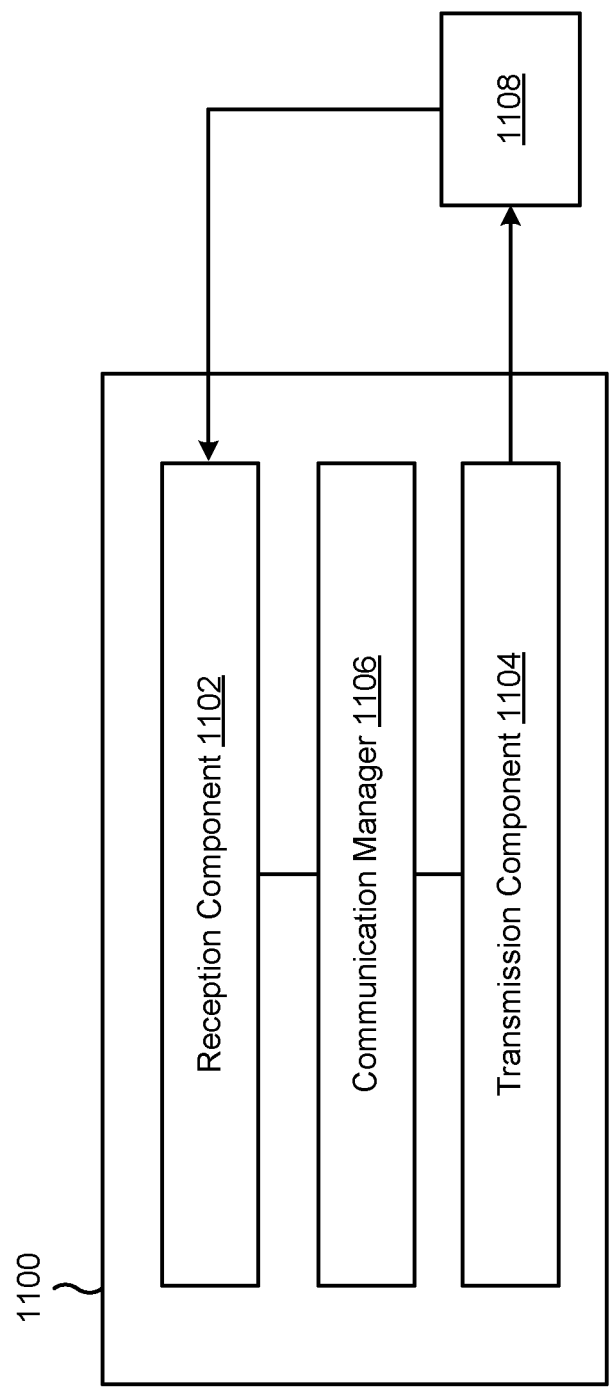
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE (e.g., UE 120, UE 520), or a UE may include the apparatus 1100. In some aspects, the apparatus 1100 includes a reception component 1102, a transmission component 1104, and/or a communication manager 1106, which may be in communication with one another (e.g., via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 1-7. Additionally, or alternatively, the apparatus 1100 may be configured to perform one or more processes described herein, such as process 800 of FIG. 8, process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

In some aspects, the communication manager 1106 may select a maximum supported rank for reception that is capped based at least in part on one or more impacted antennas of the UE that are unavailable due to SRS switching that switched at least one antenna of the UE. The transmission component 1104 may transmit an indication of the maximum supported rank. The reception component 1102 may receive a selected rank that is no greater than the maximum supported rank. The reception component 1102 may receive, from one or more non-impacted antennas of the UE, a communication using the selected rank.

The communication manager 1106 may determine a BLER based at least in part on downlink slots that are impacted with block errors. The communication manager 1106 may determine the BLER based at least in part on collisions between SRS switching and resource allocations on a victim carrier.

The communication manager 1106 may blank downlink signals for the one or more impacted antennas. The communication manager 1106 may null channel matrix entries (e.g., for H) for symbols in a slot that is associated with the one or more impacted antennas.

In some aspects, the communication manager 1106 may prepare a first communication on a first carrier and a second communication on a second carrier for transmission on a same antenna of the UE, based at least in part on SRS switching that is to switch at least one antenna of the UE. The transmission component 1104 may transmit the first communication while refraining from transmitting the second communication, based at least in part on a scheduling collision of the first communication and the second communication.

In some aspects, the communication manager 1106 may prepare a first communication on a first carrier and a second communication on a second carrier for transmission on a same antenna of the UE, based at least in part on SRS switching that is to switch at least one antenna of the UE. The communication manager 1106 may cancel the SRS switching based at least in part on a scheduling collision of the first communication and the second communication. The transmission component 1104 may transmit one or more of the first communication or the second communication based at least in part on the canceling. The communication manager 1106 may deactivate a DAC for an impacted communication of the first communication and the second communication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: selecting a maximum supported rank for reception that is capped based at least in part on one or more impacted antennas of the UE that are unavailable due to sounding reference signal (SRS) switching that switched at least one antenna of the UE; transmitting an indication of the maximum supported rank; receiving a selected rank that is no greater than the maximum supported rank; and receiving, from one or more non-impacted antennas of the UE, a communication using the selected rank.

Aspect 2: The method of Aspect 1, wherein selecting the maximum supported rank includes selecting the maximum supported rank based at least in part on a block error rate (BLER) satisfying an error threshold.

Aspect 3: The method of Aspect 2, further comprising determining the BLER based at least in part on downlink slots that are impacted with block errors.

Aspect 4: The method of Aspect 2 or 3, further comprising determining the BLER based at least in part on collisions between SRS switching and resource allocations on a victim carrier.

Aspect 5: The method of any of Aspects 1-4, wherein selecting the maximum supported rank includes selecting the maximum supported rank based at least in part on a quantity of transmit antennas of the UE and a quantity of receive antennas of the UE.

Aspect 6: The method of any of Aspects 1-5, wherein selecting the maximum supported rank includes selecting the maximum supported rank based at least in part on a quantity of carriers performing the SRS switching.

Aspect 7: The method of any of Aspects 1-6, further comprising blanking downlink signals for the one or more impacted antennas.

Aspect 8: The method of Aspect 7, wherein blanking the downlink signals includes zeroing time domain samples associated with the one or more impacted antennas.

Aspect 9: The method of Aspect 7 or 8, wherein blanking the downlink signals includes nulling channel matrix entries associated with each of the one or more impacted antennas, based at least in part on the downlink signals including demodulation reference signal symbols.

Aspect 10: The method of Aspect 9, further comprising nulling channel matrix entries for symbols in a slot that is associated with the one or more impacted antennas.

Aspect 11: The method of any of Aspects 1-10, wherein blanking the downlink signals includes blanking the downlink signals based at least in part on a start time of the SRS switching, an end time of the SRS switching, and a bitmap indicating the one or more impacted antennas.

Aspect 12: The method of any of Aspects 1-11, further comprising desensing parameters for downlink signals for the one or more impacted antennas.

Aspect 13: The method of Aspect 12, wherein desensing the parameters includes determining one or more of a frequency tracking loop, a time tracking loop, a tracking reference signal, or a channel state function based at least in part on disregarding the downlink signals for the one or more impacted antennas.

Aspect 14: The method of Aspect 12 or 13, wherein desensing the parameters includes adjusting a signal-to-noise ratio floor value for a frequency tracking loop.

Aspect 15: The method of any of Aspects 12-14, wherein desensing the parameters includes one or more of setting a maximum ratio combining window (MRCW) size for a frequency tracking loop (FTL) to zero, or excluding the downlink signals from FTL maximum ratio combining (MRC).

Aspect 16: The method of any of Aspects 12-15, wherein desensing the parameters includes one or more of setting a maximum ratio combining window (MRCW) size for Doppler to zero, excluding the downlink signals from Doppler maximum ratio combining (MRC), or excluding the downlink signals in an algorithm used for a Doppler calculation.

Aspect 17: The method of any of Aspects 12-16, wherein desensing the parameters includes skipping an SNE filter update.

Aspect 18: The method of any of Aspects 12-17, wherein desensing the parameters includes indicating that a value associated with the downlink signals is invalid.

Aspect 19: A method of wireless communication performed by a user equipment (UE), comprising: preparing a first communication on a first carrier and a second communication on a second carrier for transmission on a same antenna of the UE, based at least in part on sounding reference signal (SRS) switching that is to switch at least one antenna of the UE; and transmitting the first communication while refraining from transmitting the second communication, based at least in part on a scheduling collision of the first communication and the second communication.

Aspect 20: The method of Aspect 19, wherein the second communication is scheduled to be transmitted using an impacted antenna that is not available due to the SRS switching.

Aspect 21: The method of any of Aspects 19-20, wherein the first communication and the second communication are scheduled to be transmitted using uplink carrier aggregation.

Aspect 22: A method of wireless communication performed by a user equipment (UE), comprising: preparing a first communication on a first carrier and a second communication on a second carrier for transmission on a same antenna of the UE, based at least in part on sounding reference signal (SRS) switching that is to switch at least one antenna of the UE; canceling the SRS switching based at least in part on a scheduling collision of the first communication and the second communication; and transmitting one or more of the first communication or the second communication based at least in part on the canceling.

Aspect 23: The method of Aspect 22, further comprising deactivating a digital-to-analog converter for an impacted communication of the first communication and the second communication.

Aspect 24: The method of any of Aspects 22-23, wherein the first communication and the second communication are scheduled to be transmitted using uplink carrier aggregation.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      select a maximum supported rank for reception that is capped based at least in part on one or more impacted antennas of the UE that are unavailable due to sounding reference signal (SRS) switching that switched at least one antenna of the UE;
      transmit an indication of the maximum supported rank;
      receive a selected rank that is no greater than the maximum supported rank; and
      receive, from one or more non-impacted antennas of the UE, a communication using the selected rank.

2. The UE of claim 1,
   wherein the one or more processors, to select the maximum supported rank, are configured to select the maximum supported rank based at least in part on a block error rate (BLER) satisfying an error threshold.

3. The UE of claim 2,
   wherein the one or more processors are configured to determine the BLER based at least in part on downlink slots that are impacted with block errors.

4. The UE of claim 2,
   wherein the one or more processors are configured to determine the BLER based at least in part on collisions between SRS switching and resource allocations on a victim carrier.

5. The UE of claim 1,
   wherein the one or more processors, to select the maximum supported rank, are configured to select the maximum supported rank based at least in part on a quantity of transmit antennas of the UE and a quantity of receive antennas of the UE.

6. The UE of claim 1,
   wherein the one or more processors, to select the maximum supported rank, are configured to select the maximum supported rank based at least in part on a quantity of carriers performing the SRS switching.

7. The UE of claim 1,
   wherein the one or more processors are configured to blank downlink signals for the one or more impacted antennas.

8. The UE of claim 7,
   wherein the one or more processors, to blank the downlink signals, are configured to zero time domain samples associated with the one or more impacted antennas.

9. The UE of claim 7,
   wherein the one or more processors, to blank the downlink signals, are configured to null channel matrix entries associated with each of the one or more impacted antennas, based at least in part on the downlink signals including demodulation reference signal symbols.

10. The UE of claim 9,
    wherein the one or more processors are configured to null channel matrix entries for symbols in a slot that is associated with the one or more impacted antennas.

11. The UE of claim 7,
    wherein the one or more processors, to blank the downlink signals, are configured to blank the downlink signals based at least in part on a start time of the SRS switching, an end time of the SRS switching, and a bitmap indicating the one or more impacted antennas.

12. The UE of claim 1,
    wherein the one or more processors are configured to desense parameters for downlink signals for the one or more impacted antennas.

13. The UE of claim 12,
    wherein the one or more processors, to desense the parameters, are configured to determine one or more of a frequency tracking loop, a time tracking loop, a tracking reference signal, or a channel state function based at least in part on disregarding the downlink signals for the one or more impacted antennas.

14. The UE of claim 12,
    wherein the one or more processors, to desense the parameters, are configured to adjust a signal-to-noise ratio floor value for a frequency tracking loop.

15. The UE of claim 12,
    wherein the one or more processors, to desense the parameters, are configured to set a maximum ratio combining window (MRCW) size for a frequency tracking loop (FTL) to zero, or excluding the downlink signals from FTL maximum ratio combining (MRC).

16. The UE of claim 12, wherein the one or more processors, to desense the parameters, are configured to set a maximum ratio combining window (MRCW) size for Doppler to zero, excluding the downlink signals from Doppler maximum ratio combining (MRC), or excluding the downlink signals in an algorithm used for a Doppler calculation.

17. The UE of claim 12, wherein the one or more processors, to desense the parameters, are configured to skip an SNE filter update.

18. The UE of claim 12, wherein the one or more processors, to desense the parameters, are configured to indicate that a value associated with the downlink signals is invalid.

19. A method of wireless communication performed by a user equipment (UE), comprising:
selecting a maximum supported rank for reception that is capped based at least in part on one or more impacted antennas of the UE that are unavailable due to sounding reference signal (SRS) switching that switched at least one antenna of the UE;
transmitting an indication of the maximum supported rank;
receiving a selected rank that is no greater than the maximum supported rank; and
receiving, from one or more non-impacted antennas of the UE, a communication using the selected rank.

20. The method of claim 19, wherein selecting the maximum supported rank includes selecting the maximum supported rank based at least in part on a block error rate (BLER) satisfying an error threshold.

21. The method of claim 19, wherein selecting the maximum supported rank includes selecting the maximum supported rank based at least in part on a quantity of transmit antennas of the UE and a quantity of receive antennas of the UE.

22. The method of claim 19, wherein selecting the maximum supported rank includes selecting the maximum supported rank based at least in part on a quantity of carriers performing the SRS switching.

23. The method of claim 19, further comprising blanking downlink signals for the one or more impacted antennas.

24. The method of claim 19, further comprising desensing parameters for downlink signals for the one or more impacted antennas.

25. A non-transitory computer-readable medium storing a set of instructions for wireless communication, the set of instructions comprising:
one or more instructions that, when executed by one or more processors of a user equipment (UE), cause the user equipment to:
select a maximum supported rank for reception that is capped based at least in part on one or more impacted antennas of the UE that are unavailable due to sounding reference signal (SRS) switching that switched at least one antenna of the UE;
transmit an indication of the maximum supported rank;
receive a selected rank that is no greater than the maximum supported rank; and
receive a communication using the selected rank.

26. The non-transitory computer-readable medium of claim 25, wherein the one or more instructions, that cause the user equipment to select the maximum supported rank, cause the user equipment to select the maximum supported rank based at least in part on a block error rate (BLER) satisfying an error threshold.

27. The non-transitory computer-readable medium of claim 26, wherein the one or more instructions further cause the user equipment to determine the BLER based at least in part on downlink slots that are impacted with block errors.

28. The non-transitory computer-readable medium of claim 26, wherein the one or more instructions further cause the user equipment to determine the BLER based at least in part on collisions between SRS switching and resource allocations on a victim carrier.

29. The non-transitory computer-readable medium of claim 25, wherein the one or more instructions, that cause the user equipment to select the maximum supported rank, cause the user equipment to select the maximum supported rank based at least in part on a quantity of transmit antennas of the UE and a quantity of receive antennas of the UE.

30. An apparatus for wireless communication, comprising:
means for selecting a maximum supported rank for reception that is capped based at least in part on one or more impacted antennas of the apparatus that are unavailable due to sounding reference signal (SRS) switching that switched at least one antenna of the apparatus;
means for transmitting an indication of the maximum supported rank;
means for receiving a selected rank that is no greater than the maximum supported rank; and
means for receiving a communication using the selected rank.

* * * * *